US007394483B2

(12) United States Patent
Oka

(10) Patent No.: US 7,394,483 B2
(45) Date of Patent: Jul. 1, 2008

(54) DISPLAY EVALUATION METHOD AND APPARATUS

(75) Inventor: Koichi Oka, Otsu (JP)

(73) Assignee: Otsuka Electronics Co., Ltd., Osaka (JP)

( * ) Notice: Subject to any disclaimer, the term of this patent is extended or adjusted under 35 U.S.C. 154(b) by 487 days.

(21) Appl. No.: 11/128,300

(22) Filed: May 13, 2005

(65) Prior Publication Data

US 2005/0259153 A1 Nov. 24, 2005

(30) Foreign Application Priority Data

May 21, 2004 (JP) ............................ 2004-152077

(51) Int. Cl.
*H04N 17/00* (2006.01)
*H04N 17/02* (2006.01)

(52) U.S. Cl. ...................... 348/181; 348/180; 348/184; 348/189

(58) Field of Classification Search ......... 348/180–181, 348/184–186, 189–191, 177–178, 175; 345/87, 345/50, 684, 159; *H04N 17/00, 17/02*
See application file for complete search history.

(56) References Cited

U.S. PATENT DOCUMENTS 5,969,756 A * 10/1999 Buckley et al. ............. 348/190
6,600,468 B1 7/2003 Kim et al.
6,700,627 B2 * 3/2004 Yang et al. .................. 348/674
6,788,401 B1 9/2004 Kitabayashi et al.
6,992,697 B2 * 1/2006 Ali ............................ 348/189
7,215,361 B2 * 5/2007 Duesman et al. ............ 348/187

FOREIGN PATENT DOCUMENTS

| | | |
|---|---|---|
| JP | 60 160293 | 8/1985 |
| JP | 2000 287227 | 10/2000 |
| JP | 2001 042845 | 2/2001 |
| JP | 2001 054147 | 2/2001 |
| JP | 2001-74602 | 3/2001 |
| JP | 2001-204049 | 7/2001 |
| JP | 2003-065898 | 2/2003 |
| KR | 10 2001-0104449 | 11/2001 |
| WO | WO 01/60078 A1 | 8/2001 |

OTHER PUBLICATIONS

Notice of Allowance dated Mar. 14, 2008 issued in corresponding Korean application.

* cited by examiner

*Primary Examiner*—Trang U. Tran
(74) *Attorney, Agent, or Firm*—Finnegan, Henderson, Farabow, Garrett & Dunner, L.L.P.

(57) ABSTRACT

A measurement pattern is moved on a display, and an image of the measurement pattern is captured by making a visual field of an image sensor follow the scroll of the measurement pattern. On the basis of the captured image, a motion picture response curve is obtained. Then, the motion picture response curve is transformed into an MTF (modulation transfer function). A normalized spatial frequency value N_Sf(a %) at which an MTF value starts declining by a predetermined percentage from a highest luminance portion of the MTF is determined. Then, the motion image quality of the display is evaluated on the basis of the normalized spatial frequency value N_Sf(a %). Thus, the evaluation of the motion image quality of the display can be achieved on the basis of an intuitively understandable motion image quality evaluation index.

7 Claims, 6 Drawing Sheets

DISPLAY EVALUATION METHOD AND APPARATUS

BACKGROUND OF THE INVENTION

1. Field of the Invention

The present invention relates to a display evaluation method and apparatus for evaluating a motion image quality of a display of a to-be-evaluated display device on the basis of scrolling of a measurement pattern displayed on the display.

2. Description of Related Art

For evaluation of a motion image quality, it is a conventional practice to measure scrolling of a motion picture displayed on a display of a display device such as a liquid crystal display device (LCD), a cathode ray tube (CRT), a plasma display panel (PDP) or an electroluminescence display device (EL).

One exemplary evaluation method of this type is such that the scrolling of the motion picture is followed by a camera as by eyeballs. The motion picture is captured as a still image, and the sharpness of the captured still image is measured. Particularly in the case of a display device such as an LCD which has a longer image response time, the sharpness of an edge of an image is reduced. In this conventional display evaluation method, the reduction of the sharpness is digitized into an index (see, for example, Japanese Unexamined Patent Publication No. 2001-204049).

However, the motion image quality evaluation method described above merely focuses on objective analysis of the profile of an image displayed on a monitor when the scrolling measurement pattern is captured by the camera. In this motion image quality evaluation method, an index indicative of a motion picture display capability of the display device is not accurately and directly derived.

Accordingly, there is a demand in this technical field for an intuitive index indicative of the motion picture display capability of the display. Such index is, for example, an index indicating a maximum possible display speed or maximum possible viewing angular speed.

It is therefore an object of the present invention to provide a display evaluation method and apparatus which are capable of easily acquiring an intuitive index for the evaluation of the motion image quality of a display.

SUMMARY OF THE INVENTION

In a display evaluation method according to the present invention, a measurement pattern is scrolled on a display, and an image of the measurement pattern is captured by making a visual field of an image sensor follow the scroll of the measurement pattern. On the basis of the captured image, a motion picture response curve MPRC is determined as a function of time, an angle or a distance. Then, the motion picture response curve is transformed into an MTF (modulation transfer function). A normalized spatial frequency value N_Sf(a %) at which an MTF value starts declining by a predetermined percentage from a highest luminance portion of the MTF is determined. The term "normalized" herein means that the movement viewing angular speed $V\theta$ of the measurement pattern is involved. Then, the motion image quality of the display is evaluated on the basis of the normalized spatial frequency value N_Sf(a %).

The motion picture response curve may be a motion picture response curve MPRC($\theta$) obtained on the basis of the captured image and represented on the scale of a viewing angle $\theta$, or a motion picture response curve MPRC(t) represented on a time scale by conversion of the viewing angle $\theta$ into time. In the former case, it is necessary to convert a spatial frequency into the normalized spatial frequency after the transformation into the MTF. In the latter case, the MTF obtained through the transformation is the function of the normalized spatial frequency. The motion picture response curve may be a function of a pixel number of a camera used for the capture of the image or a function of a coordinate on an image capturing surface.

A blur limit viewing angular speed "$V\theta$,BlurLimit" may be determined by dividing the normalized spatial frequency N_Sf(a %) with the predetermined percentage reduction by a spatial frequency Sf(csf) corresponding to a visibility limit value. Therefore, the motion image quality of the display may be evaluated on the basis of the blur limit viewing angular speed $V\theta$,BlurLimit.

Alternatively, the motion image quality of the display may be evaluated on the basis of a blur limit spatial frequency Sf(limit) which is obtained by determining a standard viewing angular speed Vav of the motion picture and dividing the normalized spatial frequency N_Sf(a %) with the predetermined percentage reduction by the standard viewing angular speed Vav.

Thus, an intuitive index, such as the blur limit viewing angular speed or the blur limit spatial frequency, for the accurate evaluation of the motion image quality of the display can be provided by using the normalized spatial frequency value N_Sf(a %).

A display motion image quality evaluation apparatus according to the present invention is an apparatus for implementing the display evaluation method described above.

The foregoing and other advantages, features and effects of the present invention will become more apparent from the following description of the preferred embodiments with reference to the attached drawings.

BRIEF DESCRIPTION OF THE DRAWINGS

FIG. 3(*b*) illustrates a luminance distribution diagram of the measurement pattern P detected by the camera detection surface 31;

FIG. 3(*c*) illustrates a luminance distribution diagram of the measurement pattern P observed when an image of the measurement pattern P is captured with the least blur;

DETAILED DESCRIPTION OF PREFERRED EMBODIMENTS

Figure 1:
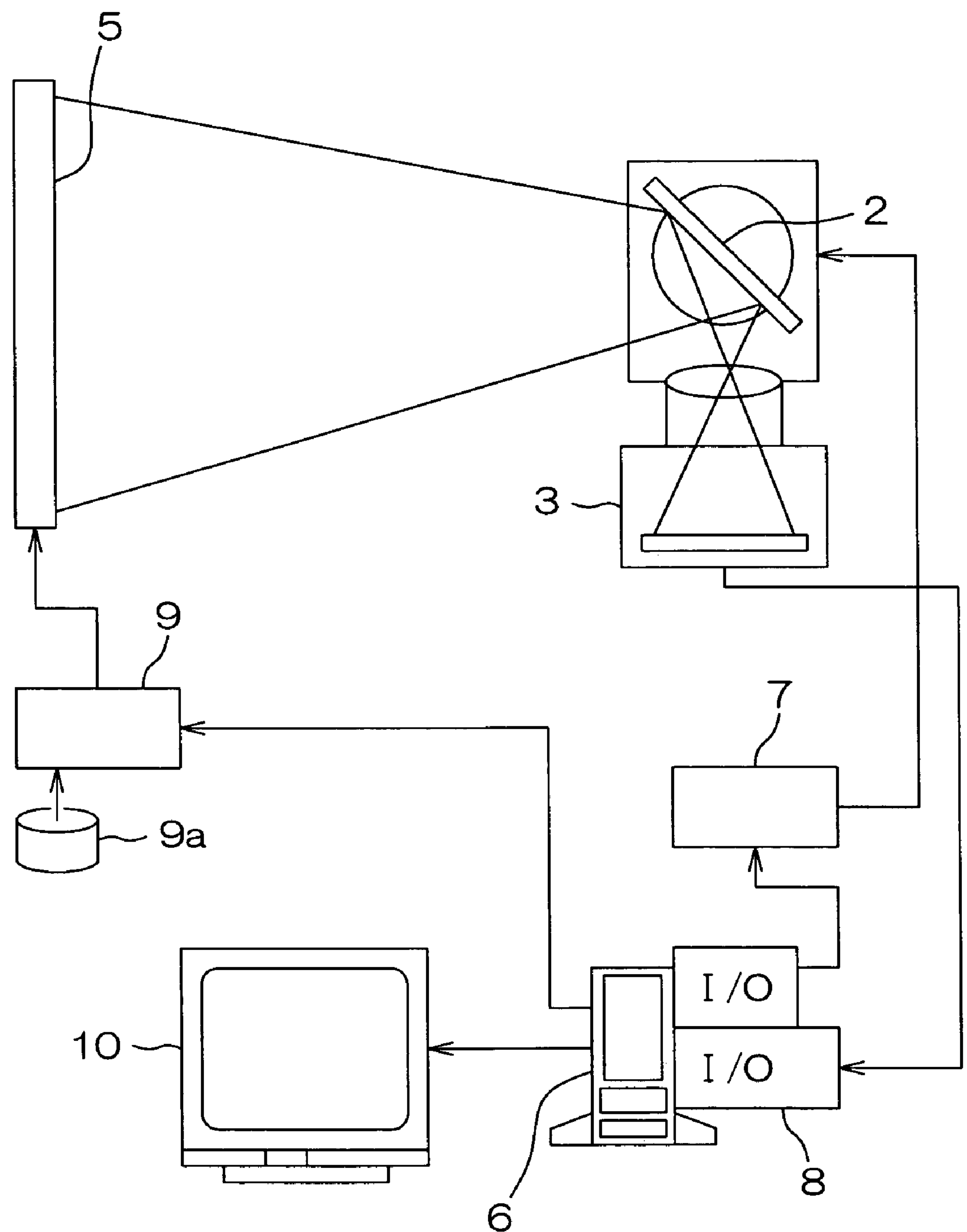
FIG. 1 is a block diagram illustrating the construction of an apparatus for implementing a display evaluation method according to an embodiment of the present invention.

FIG. 1 is a block diagram illustrating the construction of a display motion image quality evaluation apparatus for implementing a display evaluation method according to the present invention.

The display motion image quality evaluation apparatus includes a galvanometer mirror 2 and a camera 3 which captures an image of a display 5 of a to-be-evaluated display device via the galvanometer mirror 2.

The galvanometer mirror 2 includes a mirror attached to a rotation shaft of a permanent magnet disposed in a rotatable manner in a magnetic field generated by passing an electric current through a coil, so that the mirror can be rotated smoothly and speedily.

The camera 3 has a visual field which partly or entirely covers the display 5 of the to-be-evaluated display device.

The galvanometer mirror 2 is disposed between the camera 3 and the display 5, so that the visual field of the camera 3 is movable linearly (hereinafter referred to as "in a scanning direction") on the display 5 according to the rotation of the galvanometer mirror 2.

A rotative driving signal is transmitted to the galvanometer mirror 2 from a computer control section 6 through a galvanometer mirror driving controller 7.

An image signal acquired by the camera 3 is taken into the computer control section 6 through an image intake I/O board 8.

Instead of the combination of the galvanometer mirror 2 and the camera 3 provided separately, a combination of a spin base, a camera such as a light weight digital camera disposed on the spin base and a rotative driving motor for rotatively driving the spin base may be employed.

A display control signal for selection of the display 5 is transmitted to an image signal generator 9 from the computer control section 6. The image signal generator 9 supplies an image signal (stored in an image memory 9*a*) for displaying a measurement pattern P as a motion picture to the to-be-evaluated display device on the basis of the display control signal.

Further, a liquid crystal monitor 10 is connected to the computer control section 6.

Figure 2:
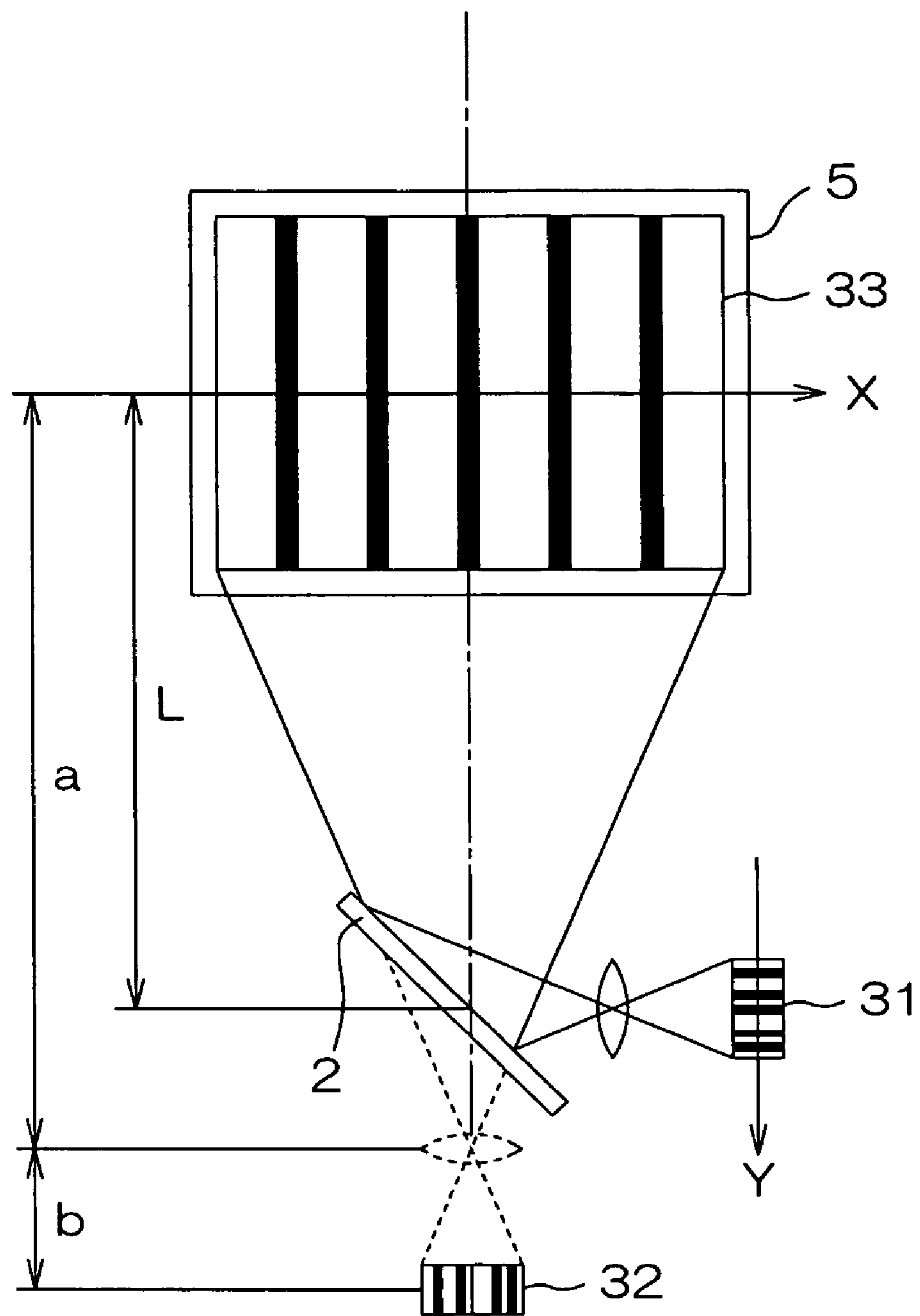
FIG. 2 is a light path diagram illustrating a positional relationship between a detection surface 31 of a camera and a display 5 of a display device to be evaluated.

FIG. 2 is a light path diagram illustrating a positional relationship between a detection surface 31 of the camera 3 and the display 5 of the to-be-evaluated display device.

Light rays from the display 5 within the visual field 33 of the camera 3 are reflected on the galvanometer mirror 2 and incident on a lens of the camera 3 thereby to be detected by the detection surface 31 of the camera 3. A mirror image 32 of the detection surface 31 of the camera 3 formed on the rear side of the galvanometer mirror 2 is indicated by a broken line.

A distance between the to-be-evaluated display device and the galvanometer mirror 2 as measured along the light path is indicated by L. Further, a distance between the to-be-evaluated display device and the lens as measured along the light path is indicated by a, and a distance between the lens and the detection surface 31 is indicated by b. If the lens has a known focal length f, a relationship between a and b can be determined by the following equation:

$$1/f=1/a+1/b$$

It is herein assumed that the display 5 of the to-be-evaluated display device is scanned along an X-axis and the detection surface 31 of the camera 3 is scanned along a Y-axis for detection. The origin X0 of the X-axis is positioned at the center of the display of the to-be-evaluated display device, and the origin Y0 of the Y-axis is positioned on the detection surface as corresponding to the origin X0. If the lens of the camera 3 has a magnification M, the following equation is satisfied:

$$X=MY$$

The magnification M is represented, using the distances a and b, by $$M=-b/a$$

If the galvanometer mirror 2 is rotated by an angle $\phi$, position on the display 5 of the to-be-evaluated display device is shifted by an angle $2\phi$ about the rotation shaft of the galvanometer mirror 2. A shift along the X-axis on the display 5 of the to-be-evaluated display device corresponding to the angle $2\phi$ is represented by:

$$X=L \tan 2\phi$$

This equation is transformed as follows:

$$\phi=\arctan(X/L)/2$$

The aforesaid equation $X=L \tan 2\phi$ is differentiated with time to provide the following equation:

$$v=2L\omega \cos^{-2}(2\phi)$$

wherein v is the movement speed of the visual field 33 on the display, and $\omega$ is the rotation viewing angular speed of the galvanometer mirror ($\omega=d\phi/dt$).

If the angle $\phi$ is very small, $\cos^2(2\phi)$ is regarded as $\cos^2(2\phi)\rightarrow 1$. Therefore, the above equation is transformed as follows:

$$\omega=v/2L$$

This means that the movement speed v of the visual field 33 on the display is proportional to the rotation viewing angular speed $\omega$ of the galvanometer mirror.

Next, the inventive display evaluation method will be described with reference to FIGS. 3(*a*) to 3(*c*).

The measurement pattern P to be displayed on the display 5 of the to-be-evaluated display device for the evaluation is a measurement pattern P which includes a band having a predetermined width as measured in the scanning direction and a luminance higher than a background thereof.

When the galvanometer mirror 2 is rotated at a certain viewing angular speed according to the movement of the measurement pattern P on the display 5 of the to-be-evaluated display device, an image of the measurement pattern P is captured by the camera 3. During the rotation of the galvanometer mirror 2, the aperture of the camera 3 is opened.

Figure 3A:
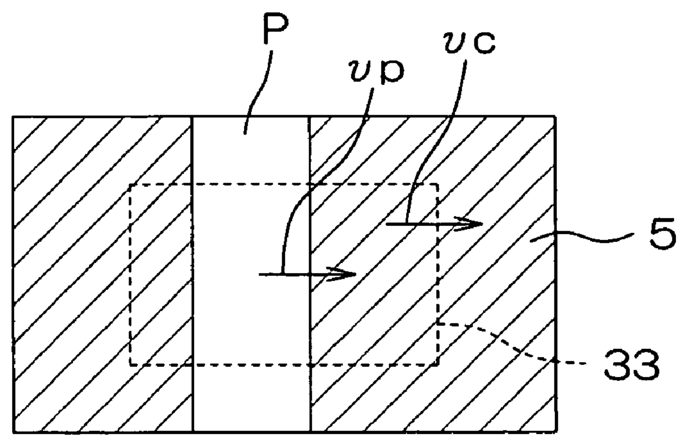
FIG. 3(*a*) illustrates how a visual field 33 associated with the camera detection surface 31 moves at a movement speed vc to follow a measurement pattern P moving at a speed vp indicated by an arrow.
Figure 3B:
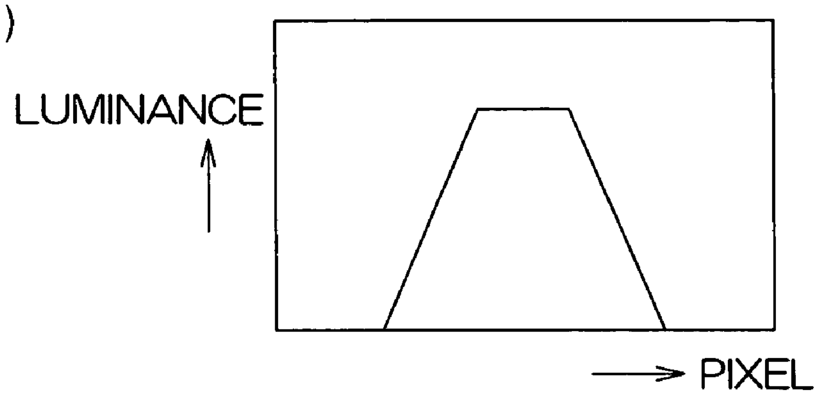
Figure 3C:
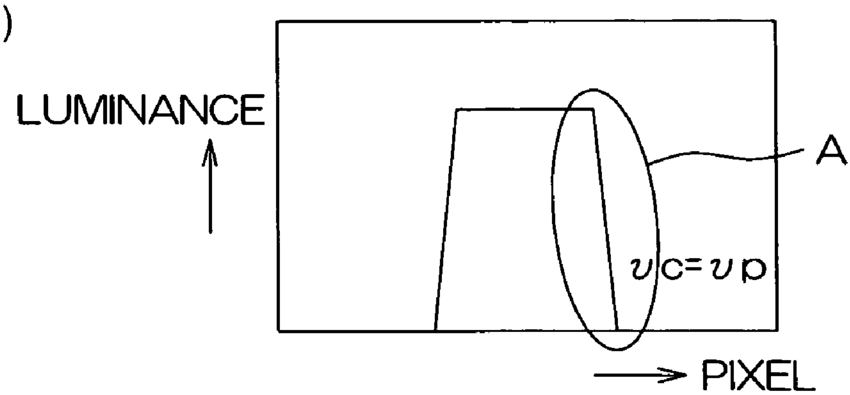

FIG. 3(*a*) illustrates how the visual field 33 associated with the camera detection surface 31 moves at a movement speed vc to follow the measurement pattern P moving at a speed vp indicated by an arrow.

FIGS. 3(*b*) and 3(*c*) each illustrates a luminance distribution of an image detected by the camera detection surface 31.

In FIGS. 3(*b*) and 3(*c*), the abscissa indicates a pixel position in a sequence of pixels arranged in the scanning direction and the ordinate indicates a luminance. The rotation viewing angular speed $\omega$ of the galvanometer mirror 2 is changed, and a rotation viewing angular speed observed when the image of the measurement pattern P is captured with the least blur is defined as ω0. At this time, the movement speed vc of the visual field 33 is equal to the movement speed vp of the measurement pattern P.

FIG. 3(*c*) particularly illustrates an image of the measurement pattern P observed when the rotation viewing angular speed is ω0.

In the above explanation, the rotation viewing angular speed ω is changed and the rotation viewing angular speed observed when the image of the measurement pattern P is captured with the least blur is defined as ω0. Alternatively, where the exposure time of the camera 3 is set very short and images of the measurement pattern P are captured a plurality of times during the rotation of the galvanometer mirror 2, a rotation viewing angular speed observed when the movement of the measurement pattern P in the scanning direction is minimized as seen in the captured images may be defined as ω0.

Next, a motion picture response curve MPRC (y) and a motion picture response curve MPRC(t) will be described.

The luminance distribution of the image of the measurement pattern P detected by the camera detection surface 31 as described above (FIG. 3(*b*) or 3(*c*)) is defined as the motion picture response curve MPRC(y). Here, y is the pixel coordinate of the camera 3 as described above.

Simply stated, the motion picture response curve MPRC(t) is a curve obtained by converting the abscissa y of the motion picture response curve MPRC(y) into time (by converting the y-axis into a time axis).

Where the ratio of the number of pixels of the display 5 of the to-be-evaluated display device to the number of pixels of the camera detection surface 31 associated with the display 5 is defined as R, the ratio R is represented by:

$$R=(Pi_{LCD}/Pi_{CCD})M_{opt}$$

wherein a subscript "LCD" indicates the display of the to-be-evaluated display device (the to-be-evaluated display is not limited to the LCD in the present invention), and a subscript "CCD" indicates the detection surface of the camera (the camera is not limited to the CCD in the present invention) Further, $Pi_{LCD}$ is the pixel pitch of the display of the to-be-evaluated display device, $Pi_{CCD}$ is the pixel pitch of the detection surface of the camera 3, and $M_{opt}$ is the magnification of the camera 3 ($M_{opt}$ is equal to the magnification M described above).

A relationship between the coordinate $X_{LCD}$ on the display 5 of the to-be-evaluated display device and the pixel coordinate y of the camera 3 (obtained by converting the coordinate Y on the detection surface of the camera 3 into a pixel number) is represented by:

$$X_{LCD}=(Pi_{LCD}/R)y$$

The viewing angle θ of the coordinate $X_{LCD}$ is represented by:

$$\theta=\arctan(X_{LCD/a})$$

wherein a is the distance between the to-be-evaluated display device and the lens as described above.

Where a viewing angular speed on the display 5 of the to-be-evaluated display device is defined as Vθ, a relationship between the viewing angular speed Vθ and a speed (dy/dt) along the sequence of the pixels on the detection surface of the camera 3 is represented by:

$$V\theta=d\theta/dt=(1/a)(dX_{LCD}/dt)=(Pi_{LCD}/aR)dy/dt$$

wherein t is time. However, this equation is an approximate expression when a is sufficiently great.

Where the viewing angular speed Vθ is constant, the pixel number on the detection surface of the camera 3 and the time can be correlated with each other by this equation. Where a change in the pixel number on the detection surface of the camera 3 is defined as Δy and a change in time is defined as Δt, the following equation is established:

$$\Delta y=(aRV\theta/Pi_{LCD})\Delta t$$

With this equation, the blur of the image on the detection surface of the camera 3 can be converted into a time span. Therefore, the abscissa y of the motion picture response curve MPRC(y) which is the luminance distribution of the image of the measurement pattern P detected by the camera detection surface 31 is converted into the time t, whereby the motion picture response curve MPRC(t) is provided.

Figure 4:
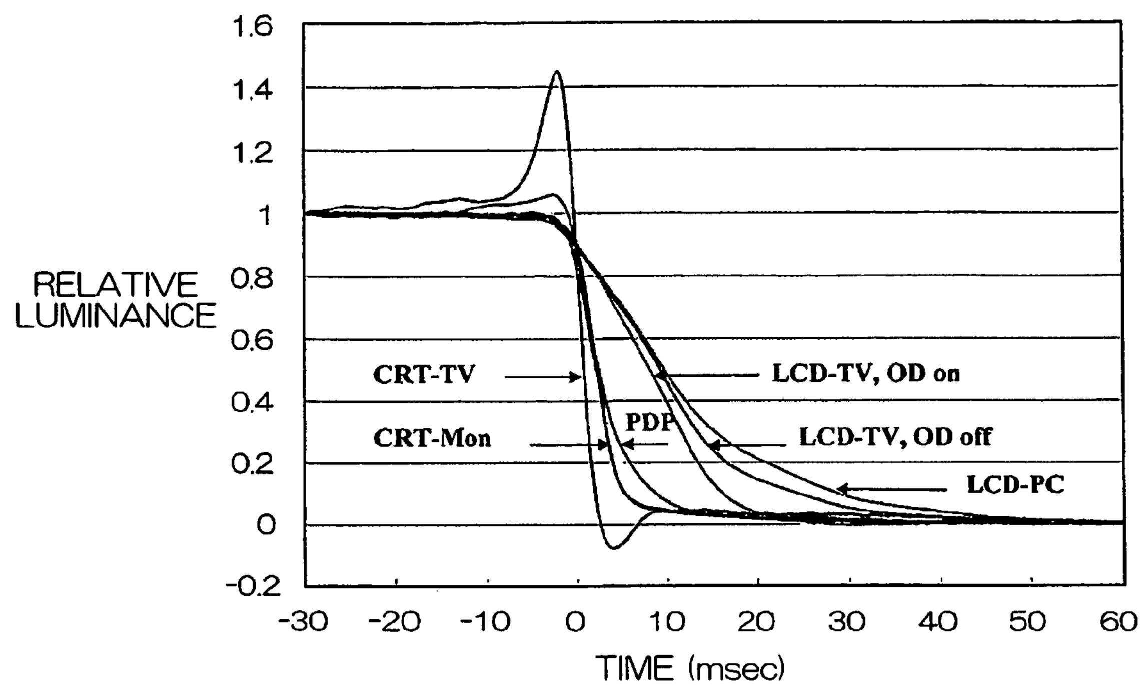
FIG. 4 is a graph illustrating motion picture response curves MPRC(t) for various display devices to be evaluated.

FIG. 4 is a graph illustrating exemplary profiles of the motion picture response curve MPRC (t) of the edged measurement pattern P (a portion indicated by a reference character A in FIG. 3(*c*)). In FIG. 4, the luminance I is plotted as the ordinate and the time is plotted as the abscissa. The luminance I on the ordinate is normalized between 0 and 1. A luminance I of 1 corresponds to the brightest portion of the measurement pattern P, and a luminance I of 0 corresponds to the darkest portion of the measurement pattern P. A point on the motion picture response curve MPRC(t) at which the luminance value on the abscissa is reduced to about 0.9 is aligned with t=0.

In FIG. 4, "CRT" indicates a cathode ray tube, "LCD" indicates a liquid crystal display device, "PC" indicates an application for a personal computer, "TV" indicates an application for a television set, and "Mon" indicates an application for a measurement instrument.

In general, if the response time of the to-be-evaluated display device is sufficiently short, the motion picture response curve MPRC(t) is such that the luminance is 1 at t<0, then steeply reduced at around t=0, and 0 at t>0. If the response time of the to-be-evaluated display device is longer, however, the motion picture response curve MPRC(t) is such that the luminance is moderately changed before and after t=O.

Referring to FIG. 4, the luminance tends to be moderately reduced after t=0 for all the display devices. Only in the case of the TV cathode ray tube CRT-TV, an overshoot occurs. This is because an edge enhancement process is performed for the TV cathode ray tube.

The motion image quality of the display device can be evaluated by quantifying the steepness of the downward inclination of the motion picture response curve MPRC (t) at around t=0.

Figure 5:
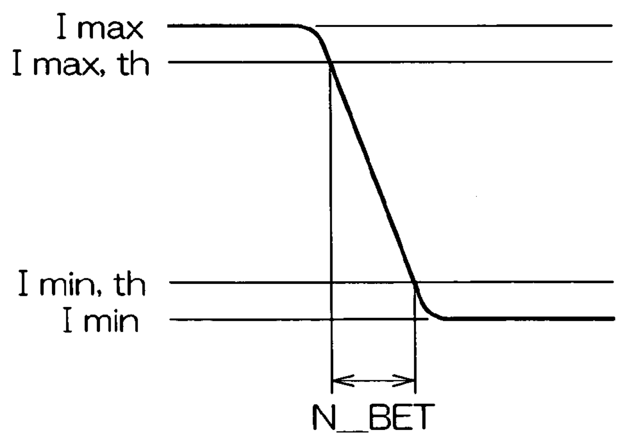
FIG. 5 is a graph schematically illustrating an edge portion of an exemplary one of the motion picture response curves MPRC(t) in FIG. 4 on an enlarged scale.

FIG. 5 is a graph schematically illustrating an edge portion of the motion picture response curve MPRC (t) in FIG. 4 on an enlarged scale.

A maximum value of the luminance is defined as Imax and a minimum value of the luminance is defined as Imin. A luminance which is smaller by a certain percentage (e.g. 10%) than Imax is defined as Imax,th, and a luminance which is greater by a certain percentage (e.g. 10%) than Imin is defined as Imin,th. A time period between a time point with Imax,th and a time point with Imin,th is referred to as motion picture blur time (normalized blurred edge time) N_BET.

Conventionally, motion picture blur times N_BET of the to-be-evaluated display device are determined for different tone levels, and an average value, a maximum value, a minimum value and the like of the motion picture blur times N_BET are determined and employed as quality indices of the display device.

In the present invention, the following process is further performed.

First, the motion picture response curve MPRC (t) is determined based on the luminance distribution of the image of the measurement pattern P, i.e. the motion picture response curve MPRC (y). The conversion from MPRC (y) to MPRC(t) is carried out in the aforesaid manner.

Then, the motion picture response curve MPRC(t) is transformed into an MTF.

The MTF is obtained from the following equation:

$$MTF(N\_Sf)=\int V\theta MPRC(t)\sin c(N\_Sf\,t)dt \quad (1)$$

An integration range should span a measurement period in principle, but may be extended by adding a predetermined period to the measurement period in actual integration.

In effect, the FFT (Fast Fourier Transform) algorithm is used for division by a frequency in the transformation. In this case, the predetermined period is also added. To eliminate a problem associated with boundary regions, correction is made by weighting through any of various weighting functions such as a COS function or setting the average at zero.

In the equation (1), $\sin c(x)=\sin(\pi x)/\pi x$, $V\theta$ is the viewing angular speed of the motion picture image, and N_Sf is a normalized spatial frequency.

In the aforesaid method, the MTF is obtained by the conversion of the motion picture response curve MPRC(t) obtained on the basis of the luminance distribution of the image of the measurement pattern P, i.e. the motion picture response curve MPRC(y).

Alternatively, the MTF may be obtained from the following equation after y of the motion picture response curve MPRC(y) is converted into the viewing angle θ, and then normalized. Where the motion picture response curve MPRC (y) is transformed into a motion picture response curve MPRC(θ) based on the viewing angle θ, the MTF is obtained from the following equation:

$$MTF(Sf)=\int MPRC(\theta)\sin c(Sf\,\theta)d\theta \quad (2)$$

wherein θ is the viewing angle of the motion picture image, and Sf is a spatial frequency (in units of cycle/degree) of MPRC(θ). An integration range should span a viewing angle measurement range in principle, but may be extended by adding a predetermined range to the measurement range in actual integration.

Since the viewing angle θ is a product of the viewing angular speed Vθ of the motion picture image and the time t, the viewing angle θ is converted into the time t with the use of the following equation:

$$\theta=t\cdot V\theta$$

As a result, the following conversion equation is provided:

$$MTF(N\_Sf)=\int V\theta MPRC(t)\sin c(N\_Sf\,t)dt.$$

The MTF is a function of the normalized spatial frequency N_Sf, wherein $N\_Sf=V\theta\cdot Sf$.

This is the same as the aforesaid equation (1).

Figure 6:
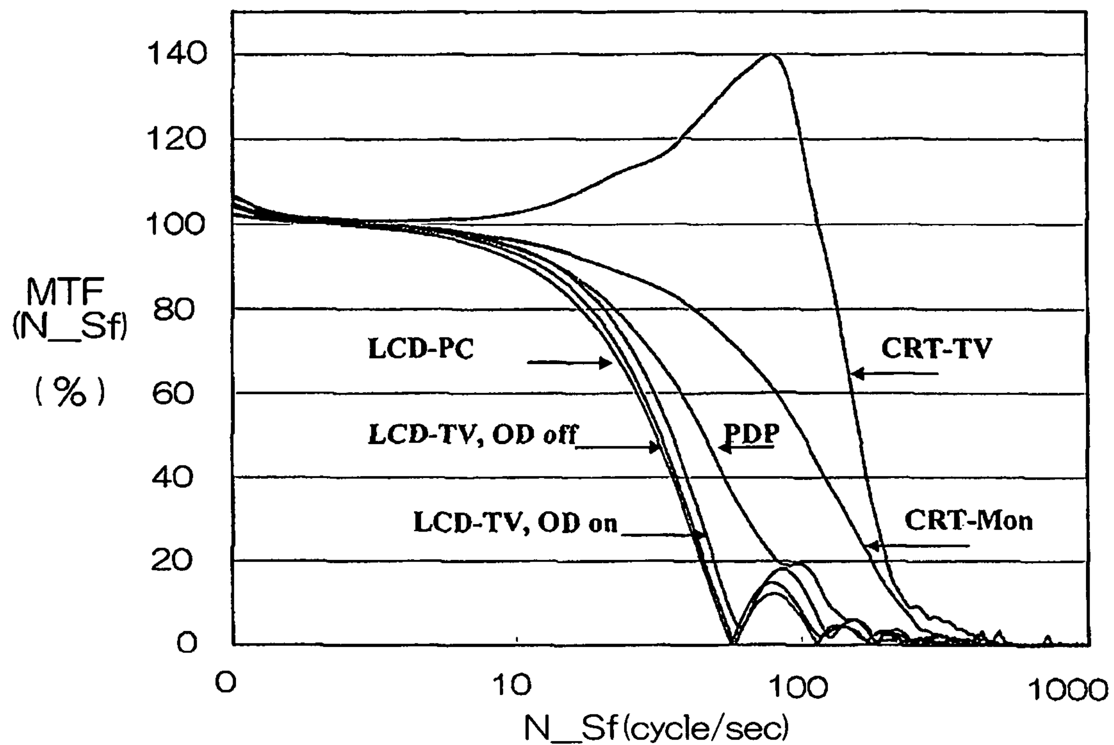
FIG. 6 is a graph illustrating normalized functions MTF (N_Sf) respectively obtained by using the motion picture response curves MPRC(t) in FIG. 4 as functions of a normalized spatial frequency N_Sf.

FIG. 6 is a graph illustrating normalized MTFs MTF (N_Sf) obtained by using the motion picture response curves MPRC(t) of the edged measurement pattern in FIG. 4 as functions of the normalized spatial frequency N_Sf.

The profiles of the functions MTF(N_Sf) each represent the degree of the blur of the image. When the MTF value is 1 (100%) over a wide range of the normalized spatial frequency N_Sf, the blur is minimized. In general, the MTF value is reduced from 1 (100%) as the normalized spatial frequency N_Sf increases. Therefore, a point at which the MTF value starts decreasing is digitized and employed as an index indicating the degree of the blur of the motion picture image. In the case of the CRT-Mon, the MTF(N_Sf) curve has a portion in which MTF value>1 (100%). This is because the edge enhancement process is performed as described above.

Therefore, a normalized spatial frequency N_Sf at which the MTF value is smaller by a % than 1 (100%) is measured. This normalized spatial frequency N_Sf is defined as N_Sf(a %). The special frequency N_Sf(a %) is an index indicating the visibility of the motion picture pattern. That is, the special frequency N_Sf(a %) is regarded as a maximum spatial frequency at which the motion picture display pattern is perceivable.

Relationships among the motion picture blur time N_BET, the normalized spatial frequency N_Sf(50%) and the normalized spatial frequency N_Sf(80%) for the respective display devices are shown in Table 1.

TABLE 1

| | N-BET (msec) | | | N-Spatial Frequency (MTF50) | | | N-Spatial Frequency (MTF80) | | |
|---|---|---|---|---|---|---|---|---|---|
| | Ave. | Max. | Min. | Ave. | Max. | Min. | Ave. | Max. | Min. |
| LCD-PC | 28.7 | 37.6 | 13.1 | 21.2 | 37.1 | 14.4 | 11.1 | 21.7 | 7.7 |
| LCD-TV: over drive off | 22.6 | 45.3 | 14.1 | 25.0 | 34.4 | 10.9 | 12.8 | 19.3 | 6.7 |
| LCD-TV: over drive on | 16.9 | 45.4 | 13.7 | 30.6 | 34.8 | 25.2 | 16.9 | 21.8 | 7.6 |
| PDP | 9.9 | 36.4 | 6.6 | 63.3 | 79.1 | 36.3 | 34.8 | 46.4 | 7.4 |
| CRT-Mon | 6.8 | 19.8 | 4.9 | 100.5 | 108.1 | 75.9 | 39.1 | 49.2 | 12.0 |
| CRT-TV | 2.8 | 7.0 | 1.5 | 191.1 | 208.4 | 160.4 | 157.6 | 180.4 | 134.0 |

In Table 1, the motion picture blur times N_BET are calculated by utilizing the method shown in FIG. 5. “Ave.”, “Max.” and “Min.” respectively indicate an average value, a maximum value and a minimum value of values measured by employing 6 types of measurement patterns having different tones.

Figure 7:
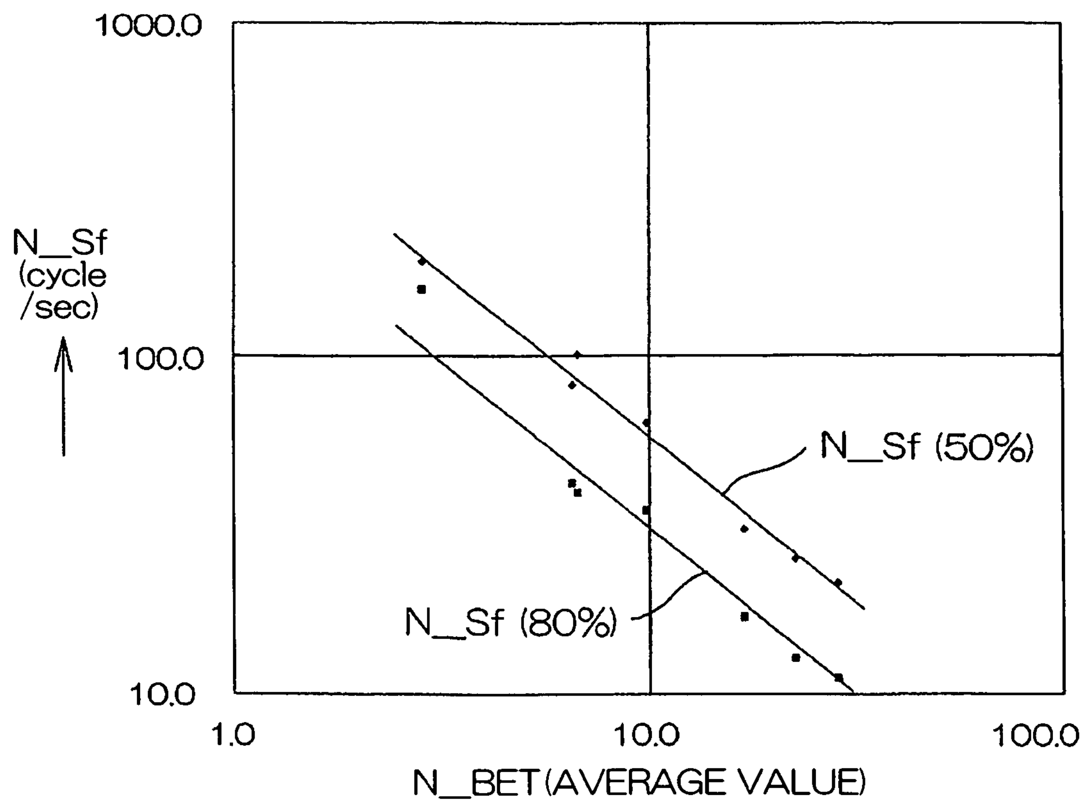
FIG. 7 is a graph illustrating relationships plotted between a motion picture blur time N_BET and N_Sf(50%) for the various display devices to be evaluated.

FIG. 7 is a graph in which the N_BET average value is plotted as the abscissa and the N_Sf(50%) average value and the N_Sf(80%) average value are plotted as the ordinate. The graph shows that there are definite correlations between the N_BET average value and the N_Sf(50%) average value and between the N_BET average value and the N_Sf(80%) average value.

This means that the normalized spatial frequency N_Sf(a %) serves as an index for evaluating the motion picture pattern display capability of the to-be-evaluated display device.

Meanwhile, it is also conceivable to evaluate the motion picture pattern display capability by using a visibility parameter such as a contrast sensitivity which is conventionally studied. It is an empirical fact that the contrast of the observed image is reduced as the spatial frequency of the image profile of the measurement pattern increases. Therefore, the degree of the reduction of the contrast is regarded as a function of the spatial frequency of the image.

Figure 8:
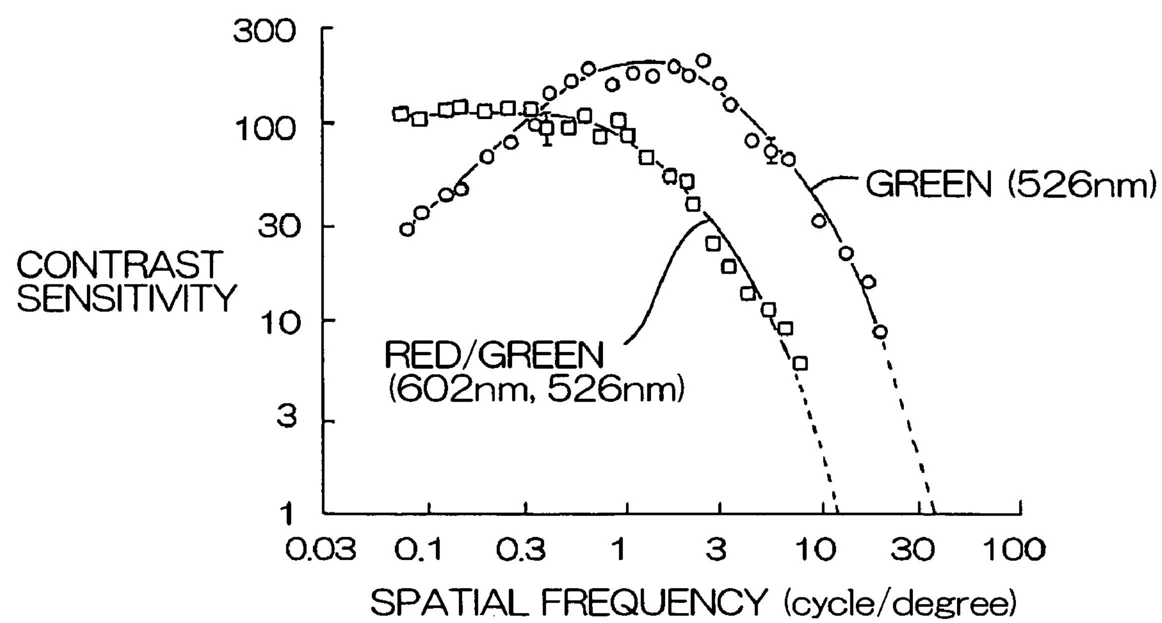
FIG. 8 is a graph illustrating contrast sensitivities respectively plotted as functions of the spatial frequency when stripe pattern images are observed.

FIG. 8 is a graph illustrating the contrast sensitivity plotted as a function of the spatial frequency obtained when a stripe pattern image is observed. In FIG. 8, circles correspond to a monochromatic stripe pattern having different tones (green 526 nm), and squares correspond to a dichromatic red and green stripe pattern (red 602 nm/green 526 nm) (see Mullen, K. T. "The Contrast Sensitivity of Human Color Vision to Red-Green and Blue-Yellow Chromatic Gratings", J. Physiol., 359, 381-400(1985)).

A spatial frequency corresponding to a preferred visibility limit value csf is herein defined as Sf(csf).

A blur limit viewing angular speed Vθ,BlurLimit can be obtained by dividing the normalized spatial frequency N_Sf (50%) by the spatial frequency Sf(csf).

$$V\theta,BlurLimit=N\_Sf(50\%)/Sf(csf)$$

For example, the normalized spatial frequency N_Sf(50%) of the LCD-PC (personal computer liquid crystal display device) in Table 1 is 21 degrees/sec. If the preferred visibility limit value is a contrast sensitivity of 100, the spatial frequency Sf(csf=100) for this limit value is 3 cycles/sec as shown in FIG. 3. Therefore, the blur limit viewing angular speed Vθ,BlurLimit is determined as follows:

$$V\theta,BlurLimit=7\ \text{degrees/sec.}$$

In this manner, the display device can be evaluated on the basis of an intuitively understandable concept, i.e. the viewing angular speed.

According to another aspect, a standard viewing angular speed Vav of the motion picture is determined by viewing the display device from a certain distance. A blur limit spatial frequency Sf(limit) at which the image starts distinctly blurring can be determined from the following equation:

$$Sf(\text{limit})=N\_Sf(50\%)/Vav.$$

In the case of a 32-inch display device having an aspect ratio of 16/9, for example, the standard viewing distance is 1195 mm. If it takes 1 second for the motion picture to move from one end to the other end of the display device, the viewing angular speed Vav is 18.9 degrees/sec. For the LCD-PC (personal computer liquid crystal display device), the normalized spatial frequency N_Sf(50%) is 21 degrees/sec as described above, and the blur limit spatial frequency Sf(limit) is as follows:

$$Sf(\text{limit})=21/18.9=1.1$$

For the CRT-Mon (measurement instrument CRT), the blur limit spatial frequency Sf(limit) is as follows:

$$Sf(\text{limit})=100.5/18.9=5.3$$

In this case, the display device can also be evaluated on the basis of an intuitively understandable concept, i.e. the spatial frequency.

While the embodiments of the present invention have thus been described, the present invention is not limited to these embodiments, but various modifications may be made within the scope of the present invention. For example, where the normalized spatial frequency N_Sf at which the MTF value is smaller by a % than 1 is measured, 50% and 80% are employed as examples of the percentage a %. However, the percentage a % is not limited to these values, but any percentage may be employed.

The disclosure of Japanese patent application No. 2004-152077 filed on May 21, 2004 is incorporated herein by reference.

The invention claimed is:

1. A display evaluation method for evaluating a motion image quality of a display on the basis of scroll of a measurement pattern displayed on the display, the method comprising steps of:

(a) scrolling the measurement pattern on the display, then capturing an image of the measurement pattern by making a visual field of an image sensor follow the scroll of the measurement pattern, and determining a motion picture response curve MPRC as a function of time on the basis of the captured image;

(b) transforming the motion picture response curve MPRC (t) into an MTF (modulation transfer function);

(c) determining a normalized spatial frequency value N_Sf(a %) at which an MTF value starts declining by a predetermined percentage a % from a highest luminance portion of the MTF, the normalized spatial frequency value N_Sf(a %) involving a movement viewing angular speed Vθ of the measurement pattern; and (d) evaluating the motion image quality of the display on the basis of the normalized spatial frequency value N_Sf(a %).

2. A display evaluation method as set forth in claim 1, wherein the step (d) comprises steps of:

determining a spatial frequency Sf(csf) corresponding to a visibility limit value csf;

determining a blur limit viewing angular speed "Vθ, BlurLimit" by dividing the normalized spatial frequency value N_Sf(a %) by the spatial frequency Sf(csf); and evaluating the motion image quality of the display on the basis of the blur limit viewing angular speed "Vθ, BlurLimit".

3. A display evaluation method as set forth in claim 1, wherein the step (d) comprises steps of:

determining a standard viewing angular speed Vav of the motion picture;

determining a blur limit spatial frequency Sf(limit) by dividing the normalized spatial frequency value N_Sf(a %) by the standard viewing angular speed Vav; and evaluating the motion image quality of the display on the basis of the blur limit spatial frequency Sf(limit).

4. A display evaluation method for evaluating a motion image quality of a display on the basis of scroll of a measurement pattern displayed on the display, the method comprising steps of:

(a) scrolling the measurement pattern on the display, then capturing an image of the measurement pattern by making a visual field of an image sensor follow the scroll of the measurement pattern, and determining a motion picture response curve MPRC as a function of an angle or a distance associated with the angle on the basis of the captured image;

(b) transforming the motion picture response curve MPRC (θ) or MPRC(y) into an MTF (modulation transfer function);

(c1) determining a spatial frequency value Sf(a %) at which an MTF value starts declining by a predetermined percentage a % from a highest luminance portion of the MTF;

(c2) converting the spatial frequency value Sf(a %) into a normalized spatial frequency value N_Sf (a %) involving a movement viewing angular speed Vθ; and (d) evaluating the motion image quality of the display on the basis of the normalized spatial frequency value N_Sf(a %).

5. A display evaluation method as set forth in claim 4, wherein the step (d) comprises steps of:

determining a spatial frequency Sf(csf) corresponding to a visibility limit value csf;

determining a blur limit viewing angular speed "Vθ, BlurLimit" by dividing the normalized spatial frequency value N_Sf(a %) by the spatial frequency Sf(csf); and evaluating the motion image quality of the display on the basis of the blur limit viewing angular speed "Vθ, BlurLimit".

6. A display evaluation method as set forth in claim 4, wherein the step (d) comprises steps of:

determining a standard viewing angular speed Vav of the motion picture;

determining a blur limit spatial frequency Sf(limit) by dividing the normalized spatial frequency value N_Sf(a %) by the standard viewing angular speed Vav; and evaluating the motion image quality of the display on the basis of the blur limit spatial frequency Sf(limit).

7. A display motion picture evaluation apparatus for evaluating a motion image quality of a display on the basis of scroll of a measurement pattern displayed on the display, the apparatus comprising:

(A) means for scrolling the measurement pattern on the display, and capturing an image of the measurement pattern by making a visual field of an image sensor follow the scroll of the measurement pattern;

(B) means for determining a motion picture response curve MPRC as a function of time or an angle on the basis of the captured image of the measurement pattern;

(C) means for transforming the motion picture response curve into an MTF (modulation transfer function);

(D) means for determining a normalized spatial frequency value N_Sf(a %) at which an MTF value starts declining by a predetermined percentage from a highest luminance portion of the MTF, the normalized spatial frequency value N_Sf(a %) involving a movement viewing angular speed Vθ of the measurement pattern; and (E) means for evaluating the motion image quality of the display on the basis of the normalized spatial frequency value N_Sf(a %).

* * * * *